United States Patent [19]
Brandman et al.

[11] Patent Number: 5,257,309
[45] Date of Patent: Oct. 26, 1993

[54] DUAL TONE MULTIFREQUENCY SIGNAL DETECTION AND IDENTIFICATION METHODS AND APPARATUS

[75] Inventors: Yigal Brandman, Palo Alto; Manoj Puri, Sunnyvale, both of Calif.

[73] Assignee: Octel Communications Corporation, Milpitas, Calif.

[21] Appl. No.: 625,366

[22] Filed: Dec. 11, 1990

[51] Int. Cl.$^5$ .......................... H04M 3/00; H03D 3/00
[52] U.S. Cl. .................................... 379/283; 379/386; 328/138
[58] Field of Search ........................ 379/386, 283, 88; 328/138

[56] References Cited

U.S. PATENT DOCUMENTS 4,689,760 8/1987 Lee et al. .............................. 379/386

FOREIGN PATENT DOCUMENTS 1188015 5/1985 Canada ................................. 379/386

Primary Examiner—James L. Dwyer
Assistant Examiner—Fan Tsang
Attorney, Agent, or Firm—Robert R. Jackson; Robert W. Morris

[57] ABSTRACT

Dual tone multifrequency ("DTMF") signal pulses are detected and identified by subjecting the signal being analyzed to complex bandpass filtering for each of the two DTMF frequency bands. The envelope of the outputs of each of these filters are determined and subjected to a succession of different tests including a ripple or smoothness test to ensure adequate smoothness, a ratio test to ensure the occurrence of a step function, a twist test to ensure the proper amplitude ratio between the two bands, and a minimum energy test to ensure that the signal has sufficient energy. If the signal passes all of the detection tests, then the actual DTMF signal is identified by using the real and imaginary parts of each complex bandpass filter output to compute an associated complex phase angle, and comparing that phase angle to the corresponding phase angles for valid DTMF tones.

32 Claims, 11 Drawing Sheets

|  | HIGH FREQUENCY DTMF TONES | | | |
|---|---|---|---|---|
|  | 1209 | 1336 | 1477 | 1633 |
| 697 | 1 | 2 | 3 | a |
| 770 | 4 | 5 | 6 | b |
| 852 | 7 | 8 | 9 | c |
| 941 | * | 0 | # | d |

LOW FREQUENCY DTMF TONES

FIG. 3

$$R(k) = \sum_{i=0}^{n} IN(k-i) * h(i) * \cos(i * SCALE)$$

$$I(k) = \sum_{i=0}^{n} IN(k-i) * h(i) * \sin(i * SCALE)$$

FIG. 4

$$R(t) + jI(t) = e^{jwt}$$

FIG. 6

$$e^{jwt} = e^{j\theta} = R_\theta + jI_\theta$$

FIG. 7

DUAL TONE MULTIFREQUENCY SIGNAL DETECTION AND IDENTIFICATION METHODS AND APPARATUS

BACKGROUND OF THE INVENTION

This invention relates to signalling systems, and more particularly to telephone systems in which dual tone multifrequency signals are used for signalling and must therefore be detected and identified.

Dual tone multifrequency ("DTMF") signals are often used for signalling in communications systems in which telephone transmission is involved because a great many telephone instruments can generate these signals, and because the frequencies involved are within the telephone transmission band. For example, in so-called voice processing or voice mail systems, the voice processor should be able not only to record voice messages for subsequent playback to the intended recipient, but should also be able to respond to various DTMF control signals originated by the person desiring to leave or retrieve a message and generated by that person using the buttons on his or her push-button telephone. Examples of the kinds of control signal information the person desiring to leave a message may want to transmit are the telephone extension number of the person for whom the message is intended, the last name of the person for whom the message is intended, or a code indicating the importance or priority of the message. Similarly, such DTMF control signals may be used by the person leaving or receiving messages to request various types of verbal prompts, instructions, menus, or helps, to skip or truncate unwanted verbal instructions, to cancel, skip, transfer, or broadcast messages, etc. Thus, the ability to quickly and correctly detect and identify DTMF signals is absolutely essential to modern voice processing systems.

It will also be appreciated that DTMF signals are often accompanied by many other types of non-DTMF signals (e.g., voice signals and/or varying levels of noise) which the voice processing system must not falsely recognize as DTMF signals. Voice signals, in particular, may sometimes have some of the characteristics of DTMF signals. It will be apparent from the above-mentioned many uses of DTMF signals in controlling voice processing systems that any false recognition of non-DTMF signals as DTMF signals will play havoc with the proper functioning of the voice processing system.

In view of the foregoing, it is an object of this invention to provide improved and simplified methods and apparatus for detecting and identifying DTMF signals.

It is a more particular object of this invention to increase the sensitivity and reliability of DTMF signal detection and identification methods and apparatus, and to do so with relatively simple algorithms which do not consume large amounts of computational resources.

It is still another object of this invention to provide DTMF detection and identification methods and apparatus which operate in noisy environments with no false detection or incorrect identification of DTMF signals as a result of the presence of non-DTMF signals such as noise or voice.

SUMMARY OF THE INVENTION

These and other objects of the invention are accomplished in accordance with the principles of the invention by providing DTMF signal detection methods and apparatus which subject the signal being analyzed to complex bandpass filtering in each of the two frequency bands in which DTMF signal frequencies conventionally occur. For each band, the envelope of the signal information passed by the complex bandpass filter is determined and subjected to a succession of tests. For example, a first test may be a so-called ripple test in which the smoothness of the envelope is determined. If the envelopes for both bands are sufficiently smooth, the ripple test for a DTMF signal is satisfied and the next test (e.g., a so-called ratio test) is performed. In the ratio test, a recently taken average envelope value is compared to the minimum envelope value during a predetermined time interval which occurred at a predetermined time prior to the taking of the average. If the average is sufficiently greater than the earlier minimum, the ratio test is satisfied. This may be required for both frequency bands, or alternatively (to allow for possible key rollover in which the person sending the DTMF signal presses an adjacent second button before releasing the first button), this may be required for only one of the two frequency bands. If the ratio test is required to be satisfied for only one frequency band, then the ripple test may be required to be satisfied for the other frequency band for the entire time over which the ratio test was performed. If the ratio test is satisfied, then the next test may be performed. This next test may be a twist test to determine whether or not the average energies of the outputs of the two complex bandpass filters have the ratio required for a proper DTMF signal. If the twist test is satisfied, then a minimum energy test may be performed to ensure that the outputs of the two complex bandpass filters have at least a required minimum energy.

If all of the foregoing DTMF detection tests are satisfied, then the system goes on to analyze the frequencies of the signal being processed in order to determine whether these frequencies are DTMF frequencies, and if so, which DTMF frequencies they are. This is preferably done by using each complex bandpass filter output to compute a complex phase angle, and then comparing that phase angle to the corresponding phase angles which are characteristic of the various valid DTMF tones. In this way, the tones that have been detected are identified, and from these tone identifications the DTMF digit or code transmitted is also detected.

Further features of the invention, its nature and various advantages will be more apparent from the accompanying drawings and the following detailed description of the preferred embodiments.

BRIEF DESCRIPTION OF THE DRAWINGS

FIG. 3 is a chart of conventional DTMF frequency assignments.

FIG. 4 shows some equations employed in a preferred embodiment of this invention. In particular, these equations specify a preferred embodiment of complex bandpass filtering in accordance with this invention.

FIGS. 6 and 7 show some additional equations employed in a preferred embodiment of this invention.

DETAILED DESCRIPTION OF THE PREFERRED EMBODIMENTS

Although the invention is equally useful in other environments, the invention will be fully understood from the following explanation of its application in the context of a voice processing or voice mail system.

Figure 1:
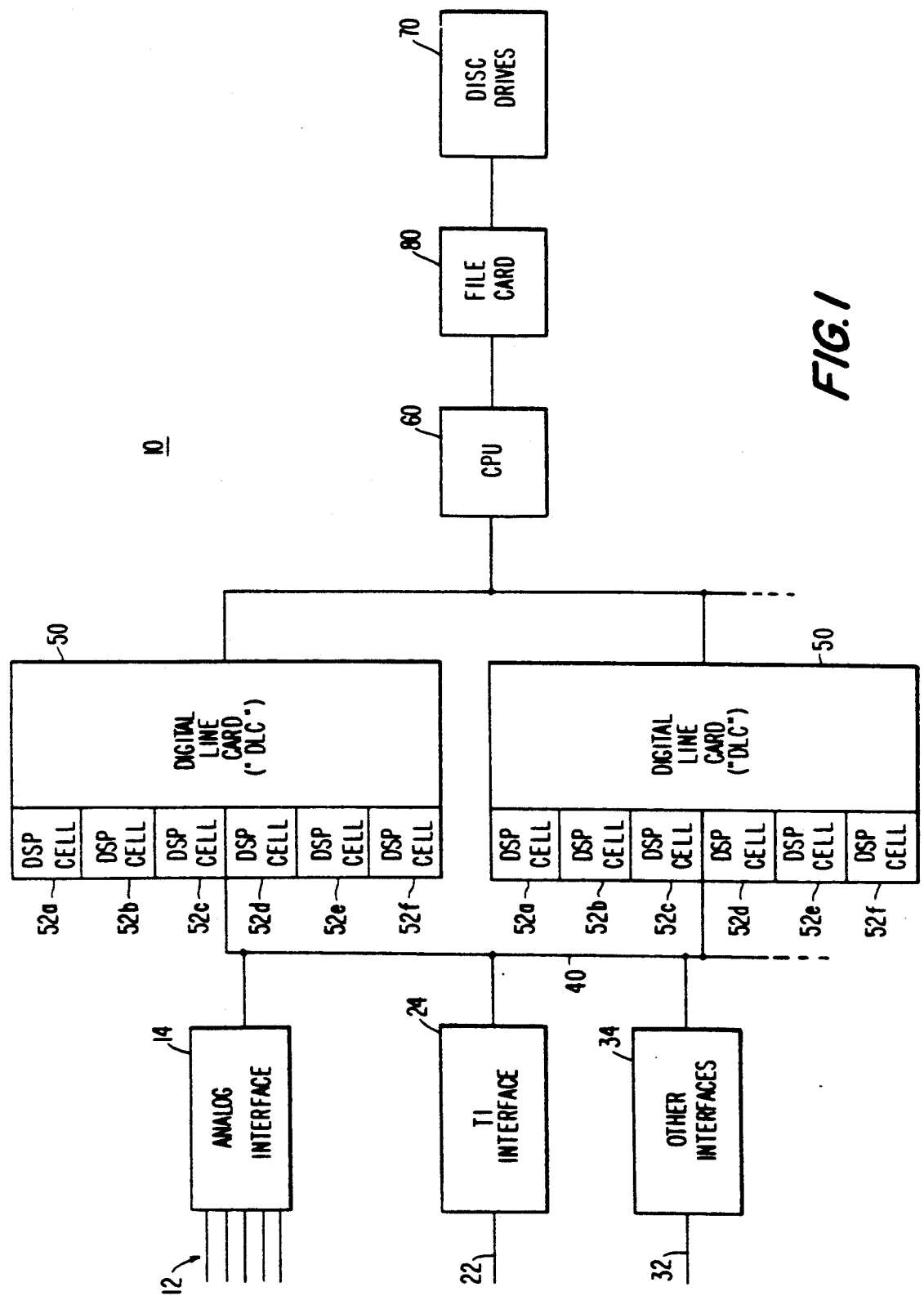
FIG. 1 is a block diagram of an illustrative voice processing system in which the present invention can be implemented and employed.

An illustrative voice processing system 10 in which this invention can be used is shown in FIG. 1. A plurality of analog telephone lines 12 are connected to conventional analog interface device 14. Analog interface device 14 converts the analog signal on each active line 12 to pulse code modulation ("PCM") digital signals on PCM bus 40. Conventional T1 interface device 24 performs a similar function with respect to the digital ("T1") signal on digital telephone line 22. Other conventional interface devices 34 perform similar functions with respect to other telephone line inputs 32

The signals on PCM bus 40 are distributed to the digital signal processor ("DSP") portions 52a-f of one or more digital line cards ("DLC") 50. Each DLC 50 includes six DSP cells 52a-f and a microprocessor such as a model 386 microprocessor available from Intel Corporation of Santa Clara, California. Each DSP cell 52 can handle the data from two analog telephone lines and includes a microprocessor such as a model TMS320C25 microprocessor available from Texas Instruments Incorporated of Houston, Texas.

Overall system control is provided by central processing unit ("CPU") 60. CPU 60 may include a suitably programmed microprocessor such as an Intel model 386 microprocessor. CPU 60 is supported by one or more conventional disc drives 70 and conventional file card 80. Disc drives 70 are the mass memory for the system (e.g., the ultimate repository of the voice messages left on the system). File card 80 controls disc drives 70, including such functions as which disc is to be used, disc redundancy, etc.

The flow of much of the information in the above-described elements is, of course, bidirectional. Thus analog interface device 14, for example, not only converts incoming analog telephone signals to incoming digital signals on bus 40, but also converts outgoing digital signals on bus 40 to outgoing analog signals on the appropriate ones of analog lines 12. Similarly, DLCs 50 (including DSPs 52) appropriately pass voice information and other data in both directions between bus 40 and CPU 60. CPU 60 acts similarly with respect to the passage of voice information and other data in both directions between elements 50, on the one hand, and elements 70 and 80, on the other hand.

The DTMF detection and identification of this invention is performed in each DSP cell 52. In particular, these functions are performed by the above-described microprocessor in each cell 52. Accordingly, some functions performed by this microprocessor (and closely related functions performed by representative interface device 14 and other associated elements) are shown in more detail in FIG. 2, which will now be described.

Figure 2:
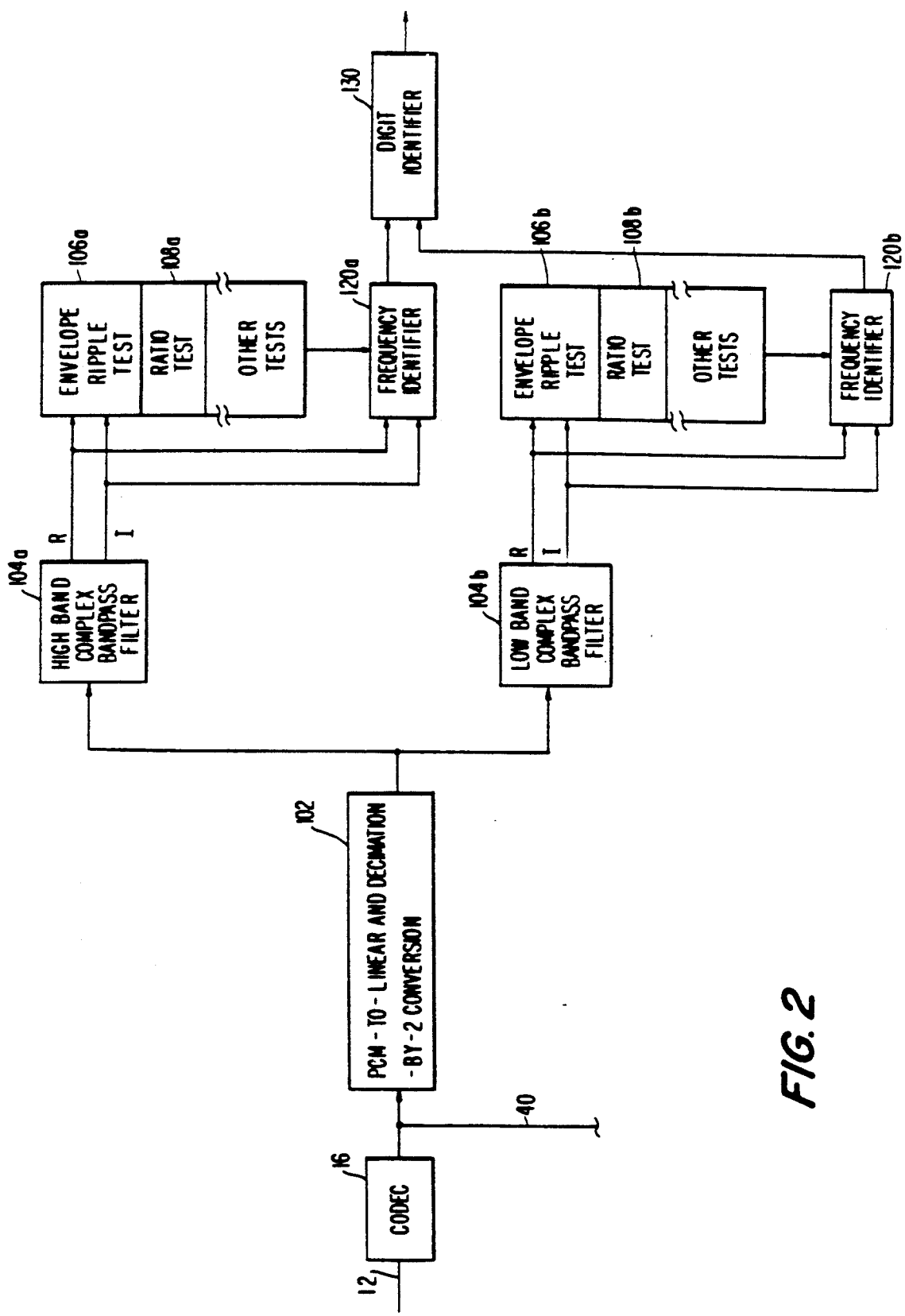
FIG. 2 is a more detailed block diagram of a portion of the apparatus shown in FIG. 1.
Figure 5A:
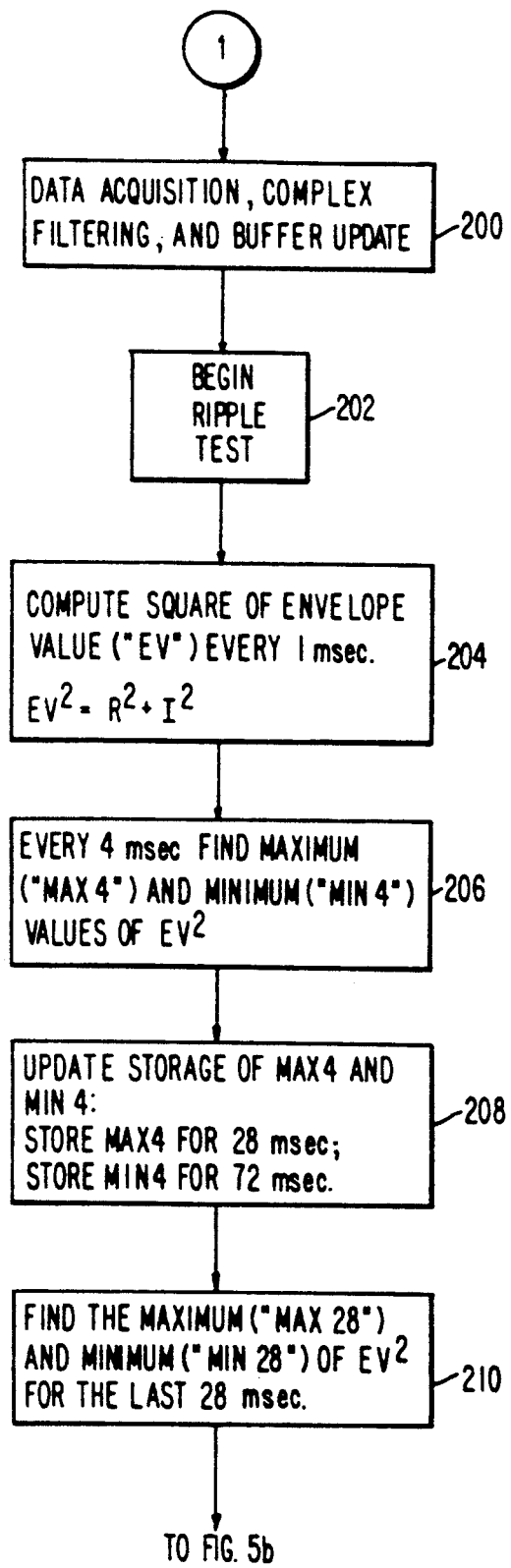
FIGS. 5a-5g (hereinafter referred to collectively as FIG. 5) comprise a flow chart illustrating portions of this invention.
Figure 5B:
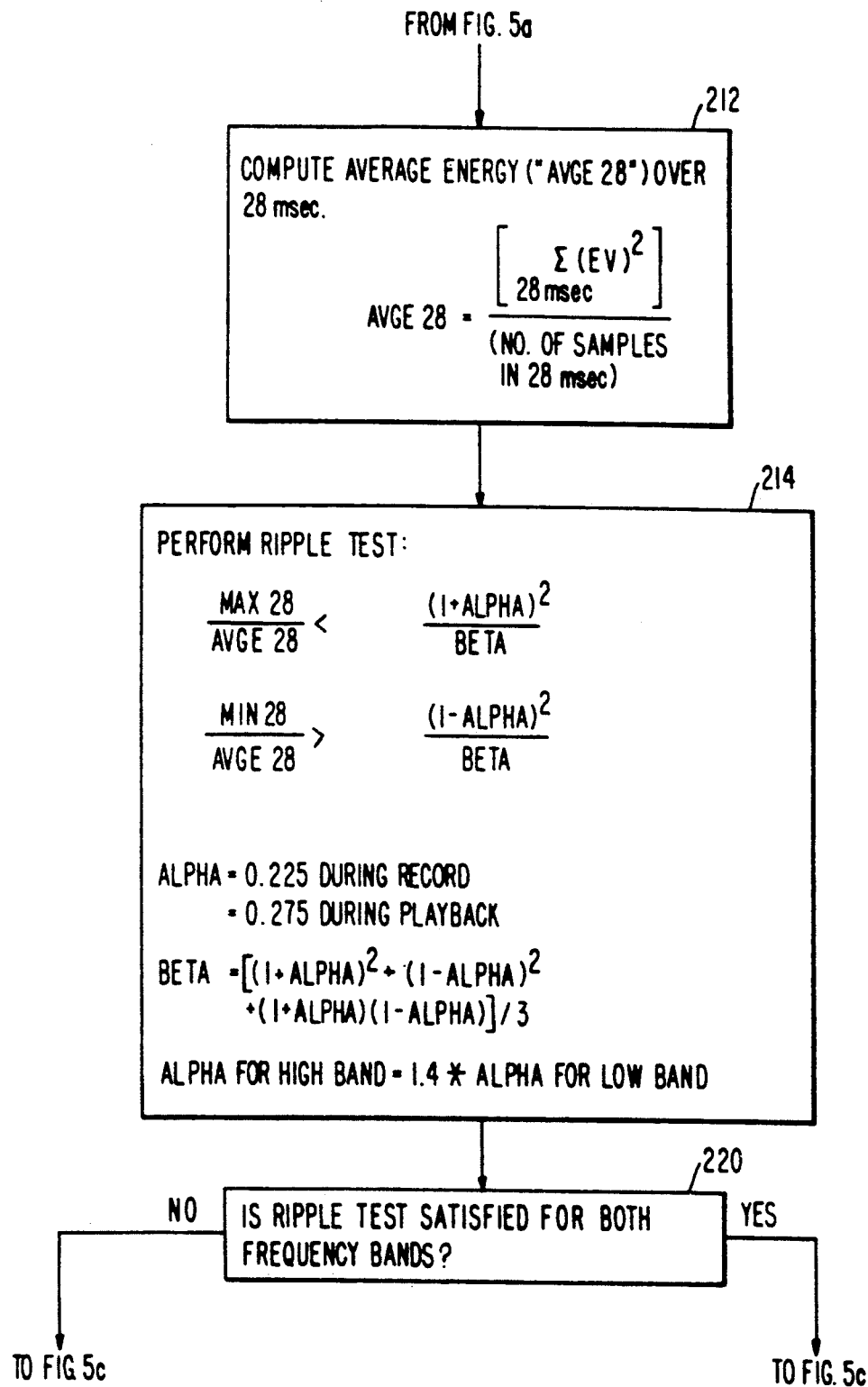
Figure 5C:
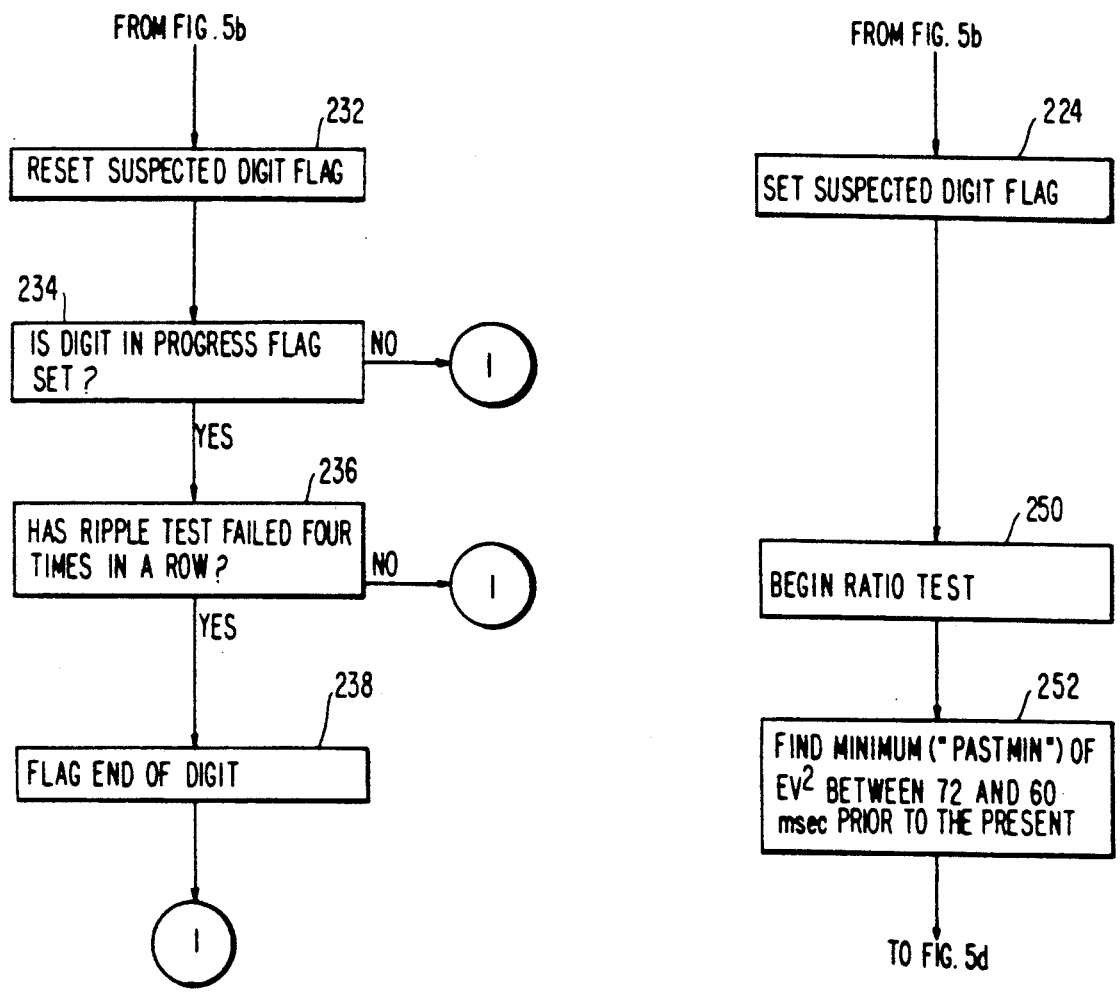
Figure 5D:
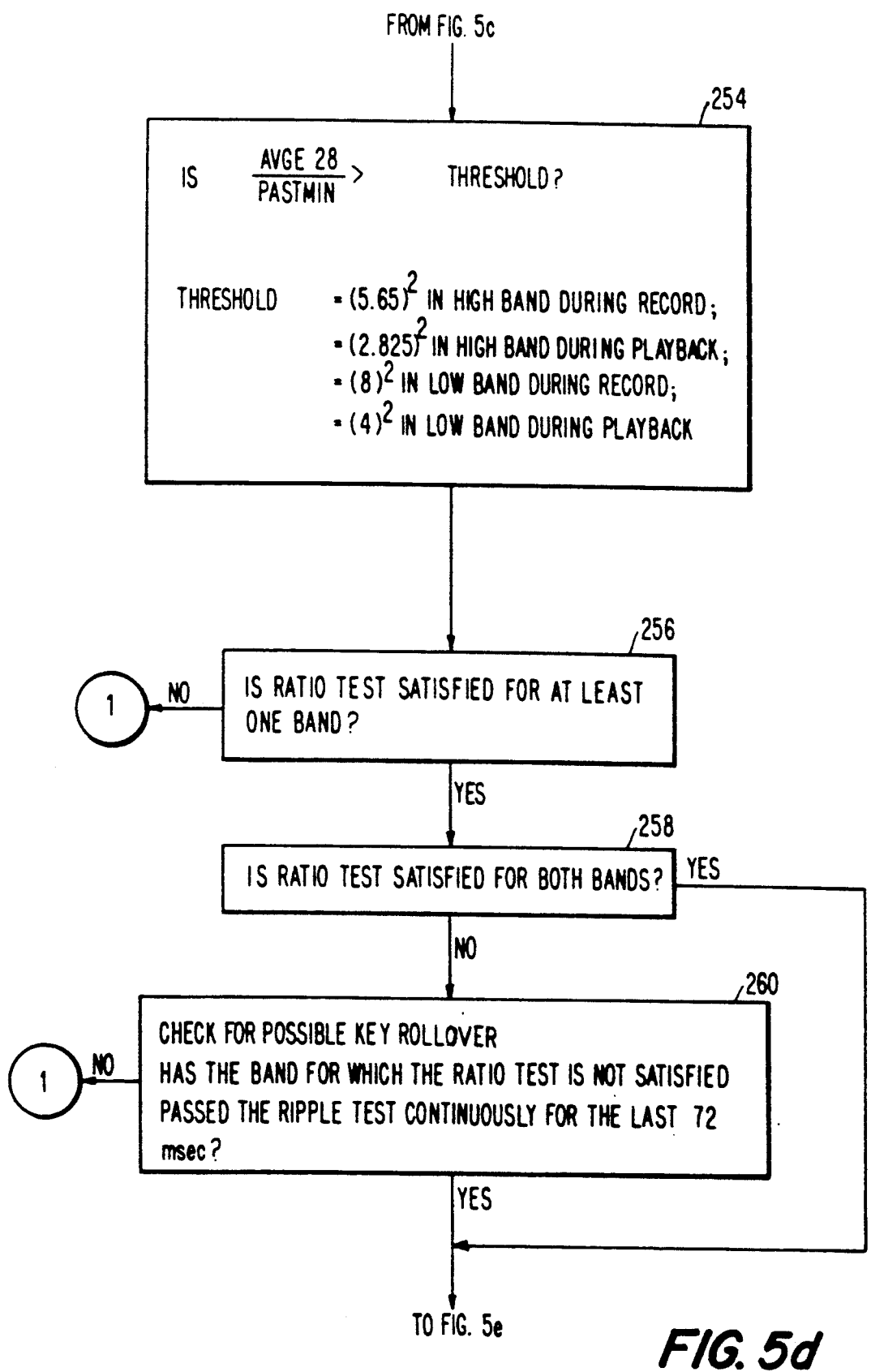
Figure 5E:
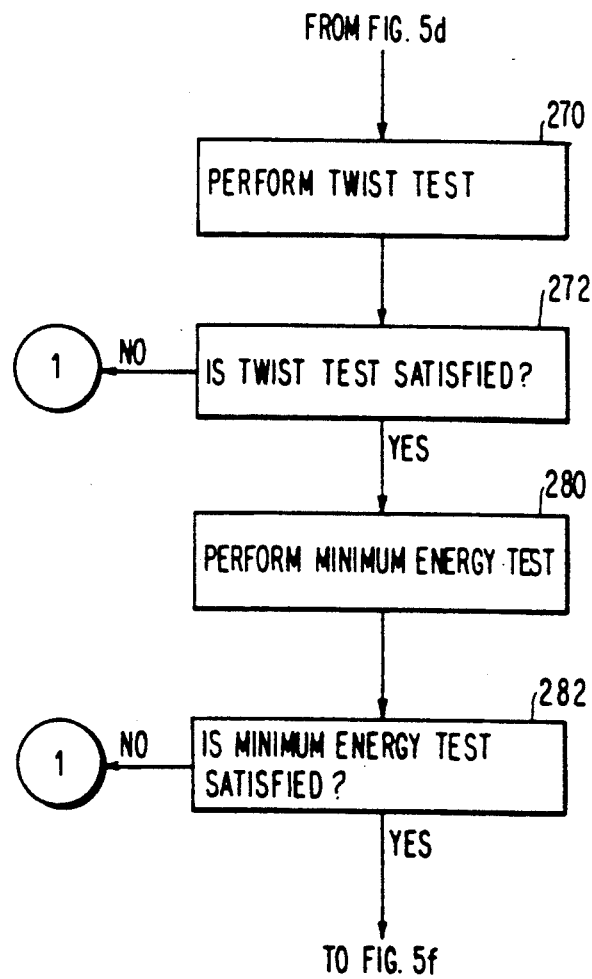
Figure 5F:
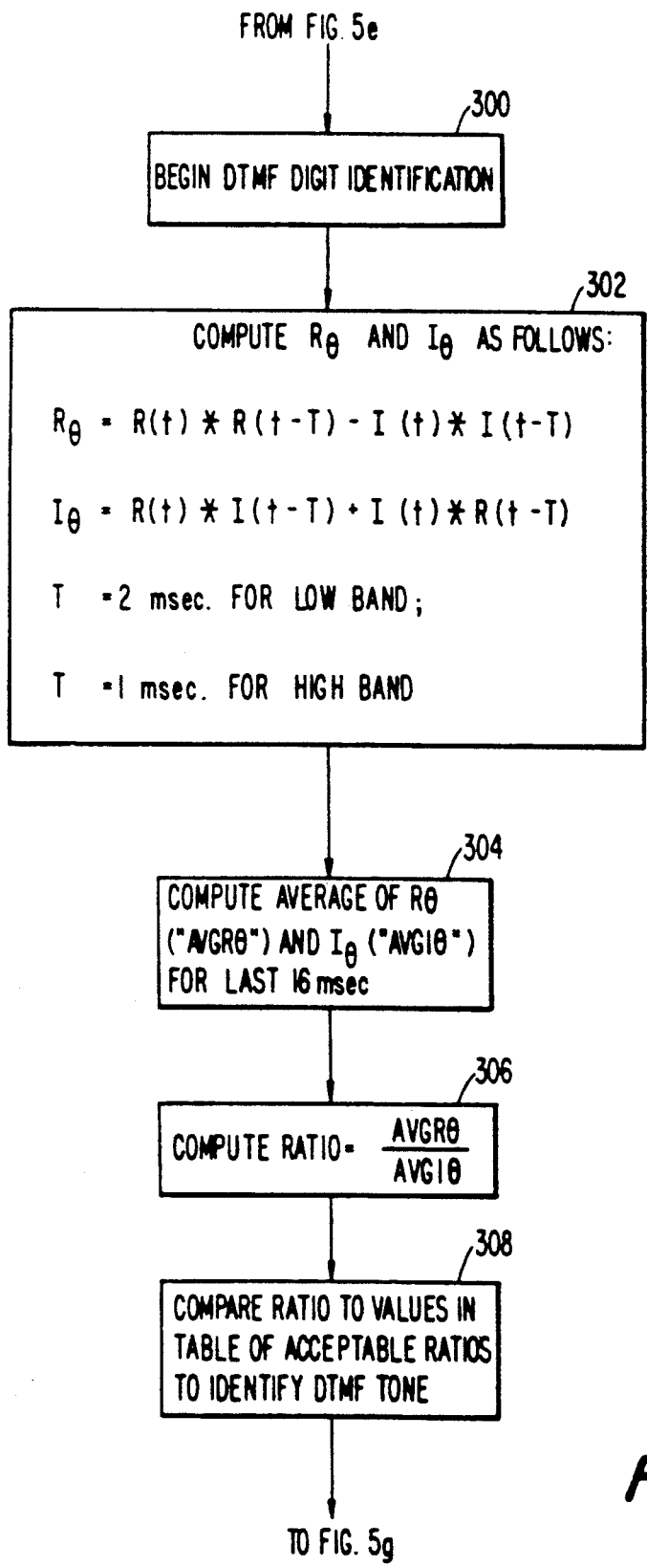
Figure 5G:
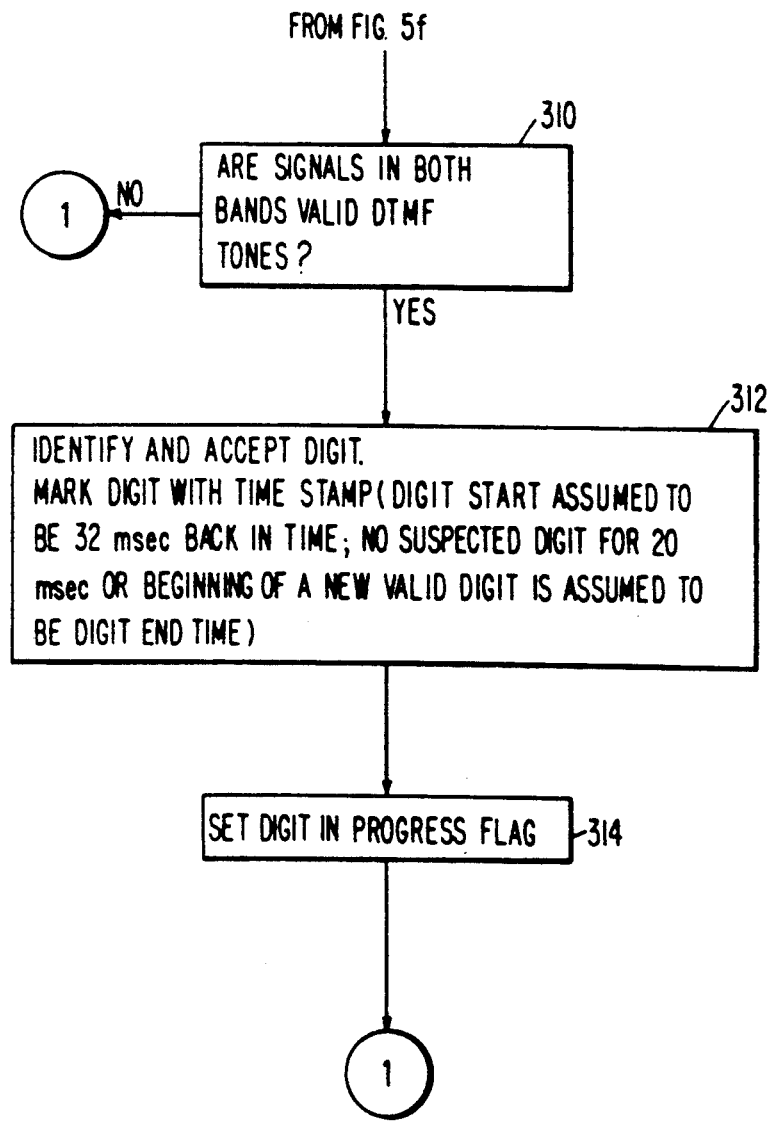

As shown in FIG. 2, analog interface device 14 includes a coder/decoder ("CODEC") 16 for each analog line 12. CODEC 16 produces PCM samples of the analog input signals at 8KHz. The DSP cell 52 to which these PCM signals are applied (more particularly, the microprocessor of that DSP cell) performs a PCM-to-linear and decimation-by-2 conversion 102. The result of this conversion is binary data at 4000 samples per second. This binary data is then subjected to high and low band complex bandpass filtering 104a and 104b, e.g., as specified by the equations shown in FIG. 4 in which R is the "real" output component of the signal information within the pass band of the associated filter 104, I is the "imaginary" output component of that signal information, k is the sample or time index, i is a running index, n is the length or number of stages in the (digital) filter being used, In is the input signal, h is the impulse response of the prototype low pass filter which defines the shape of the desired bandpass filter, and scale is a constant which determines the frequency shift between the prototype low pass filter and the desired bandpass filter. This complex bandpass filtering, which is also performed by the microprocessor in DSP cell 52, may be accomplished by conventional digital filtering techniques. The pass band of filter 104a is approximately 1100-1750 Hz (which therefore includes all the conventional high frequency DTMF tones, namely, 1209, 1336, 1477, and 1633 Hz). The pass band of filter 104b is approximately 600-1050 Hz (which therefore includes all the conventional low frequency DTMF tones, namely, 697, 770, 852, and 941 Hz). Each DTMF "digit" is, of course, conventionally represented by the simultaneous transmission of two DTMF tones, one from each of the foregoing groups, in accordance with the table shown in FIG. 3.

The R and I outputs of filters 104 are processed (still in the microprocessor in DSP cell 52) in order to perform a series of DTMF detection tests 106, 108, etc., on the outputs of each filter and to thereby determine whether those outputs contain DTMF tones. If these DTMF detection tests are satisfied, then the R and I outputs of filters 104 are additionally processed (in the frequency identifier portion 120 of the tasks performed by the DSP cell microprocessor) to determine whether the signals being processed are DTMF tones, and if so, which DTMF tones they are. This in turn allows identification of the particular DTMF digit received in accordance with the table shown in FIG. 3. DTMF detection tests 106, 108, etc., will now be discussed in more detail with reference to the flow chart of FIG. 5.

The test sequence begins with data acquisition, complex filtering (as in elements 104 in FIG. 2), and buffer updating as shown in step 200 in FIG. 5.

The first test performed on the R and I outputs of the complex bandpass filter 104 for each DTMF frequency band is the so-called ripple test which begins at step 202 in FIG. 5. Basically, the ripple test determines whether or not the amplitude or envelope of the complex bandpass filter outputs is relatively smooth over a predetermined time interval (as it will be if a single frequency such as a DTMF tone within the passband of the filter dominates the signal applied to the filter during the predetermined time interval). If multiple frequencies are strongly present in the signal applied to the filter, then the amplitude or envelope of the filter outputs will not be sufficiently smooth over the predetermined time interval, to allow those outputs to satisfy the ripple test. For example, if the signal applied to one of filters 104 is a single frequency, sin $\omega t$ (where $\omega$ is within the passband of the filter), the R output of the filter will be sin $\omega t$ and the I output of the filter will be cos $\omega t$ (ignoring possible phase and amplitude shifts between the input and output of the filter). Accordingly, the amplitude or envelope of the filter outputs will be constant (i.e., the square root of $\sin^2\omega t + \cos^2\omega t$). This will not be true if the input to the filter includes two or more relatively strong frequencies within the pass band of the filter. Note again that the ripple test shown in FIG. 5 is performed for the outputs of both of filters 104 and must be satisfied for the outputs of both of those filters.

Continuing now with FIG. 5, in step 204 the square of an envelope value ("EV") is computed for each DTMF frequency band each millisecond using the equation shown in step 204. Step 206 and subsequent steps are performed every 4 milliseconds. In step 206 the maximum ("MAX4") and minimum ("MIN4") values of $EV^2$ are found for the 4 milliseconds being considered. In step 208 storage of recent values of MAX4 and MIN4 values is updated with the most recent values from step 206. MAX4 values are stored for 28 milliseconds; MIN4 values are stored for 72 milliseconds. In step 210 the maximum ("MAX28") and minimum ("MIN28") values of $EV^2$ for the most recent 28 milliseconds are determined.

In step 212 the average energy ("AVGE28") in the filter outputs over the most recent 28 milliseconds is determined using the equation shown in step 212. In step 214 the ripple test calculation is performed using the relationships shown in step 214. To pass the ripple test, the ratio of MAX28 to AVGE28 must be less than the depicted first function of ALPHA, and the ratio of MIN28 to AVGE28 must be more than the depicted second function of ALPHA. ALPHA is an arbitrary threshold constant, the values shown in step 214 having been found to give good results. Note that ALPHA is reduced while the voice processing system is not sending out any voice messages (i.e., during record mode). This increases the sensitivity of the system while it is most likely to receive DTMF signals. ALPHA is increased somewhat during playback to tolerate more disturbance caused by the echo of the relatively strong voice signals produced by the voice processing system. ALPHA is also higher for the high frequency band than for the low frequency band because the high band is wider than the low band and therefore has a lower signal-to-noise ratio than the low band.

Step 220 determines whether the ripple test has been satisfied for both DTMF frequency bands. If so, a suspected DTMF digit has been detected, and in step 224 a suspected digit flag is set. After the suspected digit flag has been set, the performance of a second DTMF detection test (i.e., the so-called ratio test) begins with step 250.

Returning now to the other branch from step 220, if the ripple test is not satisfied for both frequency bands, then the suspected digit flag is reset in step 232. In step 234 a digit in progress flag (set, as described below, after all DTMF detection tests have been satisfied to indicate that a DTMF digit has been detected and is in the process of being transmitted and received) is tested. If the digit in progress flag is not set, control returns to step 200 to ready the logic to start collecting and processing more data at the appropriate time. On the other hand, if the digit in progress flag is set, step 236 determines whether or not the ripple test has failed four times in a row. If not, control returns to step 200. If so, the end of the digit currently in progress is flagged in step 238, and then control returns to step 200.

As mentioned above, when the ripple test has been satisfied, the ratio test is performed beginning at step 250. As in the case of the ripple test, the ratio test is performed for both DTMF frequency bands, although under certain circumstances (to account for possible key rollover in which a second key is pressed before the first key has been released) it will only be necessary for one DTMF frequency band to satisfy the ratio test. The purpose of the ratio test is to ensure that there has been a recent step function (i.e., substantial increase) in EV for the outputs of complex bandpass filters 104. This is done by comparing a recent average energy value to the minimum value of $EV^2$ at a time substantially prior to the time during which the ripple test was just satisfied. If the ratio of these two values is sufficiently high, the ratio test is satisfied. In particular, in step 252 the minimum value ("PASTMIN") of $EV^2$ during the time interval from 60 to 72 milliseconds prior to the present is determined. In step 254 the ratio of the average energy during the last 28 milliseconds (computed as in step 212) to PASTMIN is formed to determine whether that ratio is greater than the appropriate one of several threshold values. In the illustrated preferred embodiment the threshold value is $(5.65)^2$ for the high frequency DTMF band while the system is in the record mode, and one quarter of that value (i.e., $(2.825)^2$) for that band while the system is in the playback mode. The corresponding threshold values for the low frequency DTMF band are $(8)^2$ and $(4)^2$. The threshold values are different for the two frequency bands and during record and playback modes for the same reasons that the thresholds are different in step 214.

Step 256 determines whether or not the ratio test (of step 254) is satisfied for at least one of the two DTMF frequency bands. If not, control returns to step 200 where the test cycle begins again at the appropriate time. If the ratio test is satisfied for only one band (as determined in step 258), then the system performs step 260 to check for possible key rollover (i.e., depression of a second adjacent key before the first key was released). If key rollover has occurred, then the band for which the ratio test is not satisfied should have continuously satisfied the ripple test throughout the ratio test time interval (i.e., for the last 72 milliseconds). If this is not the case, then the ratio test is not satisfied and control returns to step 200. The ratio test is satisfactorily completed, however, if either step 258 or step 260 produces an affirmative result. In that event, the next DTMF detection test (i.e., the so-called twist test) is performed at step 270.

There is supposed to be a predetermined amplitude ratio ("twist") between the tones in the high and low frequency DTMF bands. Thus the twist test performed in step 270 may be a substantially conventional test for ensuring that the ratio of the average energy of the outputs of complex bandpass filter 104a to the average energy of the outputs of complex bandpass filter 104b is in the correct range. Approximate average energy values such as AVGE28 may be used to perform this test. If the twist test (of step 270) is not satisfied, then step 272 returns control to step 200. On the other hand, if the twist test is satisfied, then the next DTMF detection test (i.e., the minimum energy test) is performed at step 280.

The minimum energy test may be substantially conventional. The purpose of this test is to ensure that there is at least a predetermined minimum amount of energy in each of the DTMF frequency bands. Again, approximate average energy values such as AVGE28 may be used to perform this test. If the minimum energy test (of step 280) is not satisfied for both bands, then step 282 returns control to step 200. Otherwise, the system is now ready (in step 300) to begin actual identification of the DTMF tones being received in order to identify the DTMF digit being transmitted and received.

Satisfaction of all of the foregoing DTMF detection tests means that the outputs of each of complex bandpass filters 104 are strongly dominated by a single frequency which is probably (although not yet certainly) one of the DTMF tones within the pass band of that filter. Accordingly, for purposes of explanation it will now be assumed that the outputs of each of filters 104 contain only a single frequency. Assuming that this single frequency is $\omega$ for a representative one of filters 104, then R and I for that filter can be represented together (at any time t) as shown in FIG. 6. This relationship can be used in reverse to isolate and thereby determine $\omega$ as follows. If the value on the right-hand side of the relationship in FIG. 6 is computed at two times separated by a known time interval T (which is less than the period of oscillation associated with $\omega$), the result can be represented as shown toward the left in FIG. 7, where $\theta$ is the complex phase change which occurs in the outputs of the complex bandpass filter 104 during time interval T. The relationship of FIG. 6 can then be reversed to express what is shown toward the left in FIG. 7 as shown on the right in that FIG.

Figure 8:
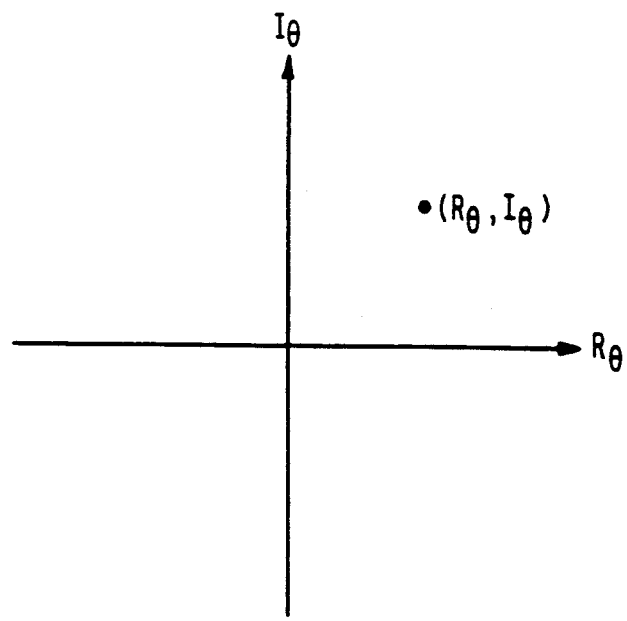
FIGS. 8 and 9 are graphs of complex variables which are useful in explaining the principles of this invention.
Figure 9:
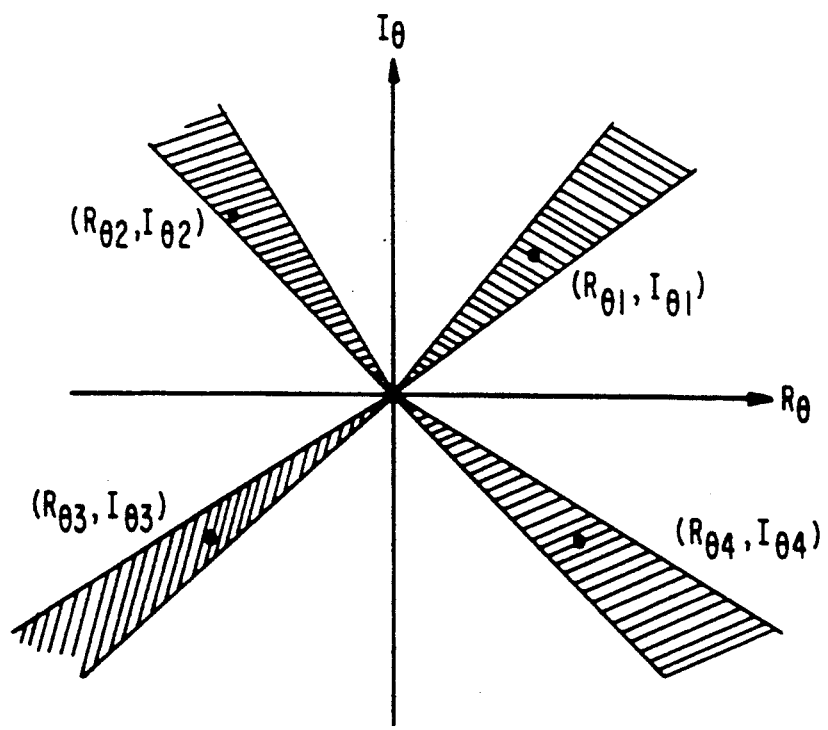

The values on the right in FIG. 7 can be plotted in the complex plane as shown in FIG. 8. Because T is known, the location of the point $R_\theta$, $I_\theta$ in the complex plane is dependent on and therefore indicative of $\omega$. Accordingly, with an appropriate choice of T, the four DTMF tones in each DTMF frequency band can be well separated from one another in the complex plane as shown, for example, in FIG. 9. Each DTMF tone will therefore produce a unique and easily distinguishable ratio of $R_\theta$ to $I_\theta$. This will be true even though some allowance must be made for slight variations in the acceptable frequencies (the acceptance regions for each tone due to such variations being indicated by the shaded wedges in FIG. 9). Each of the above-mentioned ratios of $R_\theta$ to $I_\theta$ represents the slope of a radial line in the complex plane. The wedge-shaped acceptance regions in FIG. 9 are also bounded by lines having predetermined slopes and therefore characteristic $R_\theta$ to $I_\theta$ ratios. The $R_\theta$ to $I_\theta$ ratio for the outputs of each complex bandpass filter 104 must therefore fall between the $R_\theta$ to $I_\theta$ ratios for one of the acceptance regions in order to be identified as a valid DTMF tone, and the acceptance region into which that $R_\theta$ to $I_\theta$ ratio falls identifies which DTMF tone has been received. The particular steps used to carry out the foregoing analysis will now be discussed with continued reference to FIG. 5 (the frequency and digit identification functions being also respectively represented by elements 120 and 130 in FIG. 2).

Once again, steps 302-308 are performed for the outputs of each of filters 104. In step 302 values of $R_\theta$ and $I_\theta$ are computed from the indicated values of the filter 104 outputs at time t and at a time 2 milliseconds prior to t for the low frequency band or 1 millisecond prior to t for the high frequency band. (Accordingly, T in the preceding discussion is 2 milliseconds for the low frequency band or 1 millisecond for the high frequency band.) Step 302 is repeated for 16 milliseconds (preferably using data which has already been collected). In step 304 $R_\theta$ and $I_\theta$ are averaged for 16 milliseconds in order to produce the values AVGR$\theta$ and AVGI$\theta$. In step 306 the ratio of AVGR$\theta$ to AVGI$\theta$ is computed, and in step 308 this ratio is compared to the acceptable values (based on the acceptance regions discussed above in connection with FIG. 9) to determine whether or not the detected tone is a valid DTMF tone, and if so, which tone it is. Step 310 tests whether the tones in both bands are valid DTMF tones, and if so, the DTMF digit is identified and accepted in step 312. In addition, step 312 tags the accepted digit with a start time (assumed to be 32 milliseconds prior to the time of acceptance of the digit to account for (1) the 16 milliseconds consumed by the requirement that the ripple test be satisfied for four consecutive 4 millisecond intervals and (2) the 16 milliseconds required for computation of AVGR$\theta$ and AVGI$\theta$ ). Ultimately the digit is also tagged with an end time (when there has been no suspected digit for 20 milliseconds or when a new valid digit begins). In step 314 the digit in progress flag is set and thereafter control returns to step 200. Control also returns to step 200 if the test of step 310 is not satisfied.

It will be understood that the foregoing is merely illustrative of the principles of this invention, and that various modifications can be made by those skilled in the art without departing from the scope and spirit of the invention. For example, the order in which the DTMF detection tests are performed can be changed if desired.

The invention claimed is:

1. The method of detecting a dual tone multifrequency pulse in an applied signal, said pulse comprising at least two tones having frequencies which are respectively approximately equal to the frequencies of two reference tones, said method comprising the steps of:
bandpass filtering the applied signal using first and second bandpass filters, the pass band of said first filter including the frequency of a first of said reference tones, and the pass band of said second filter including the frequency of a second of said reference tones;
determining the envelope of the output signal of each of said filters;
monitoring the smoothness of the envelope associated with each of said filters over a predetermined first time interval in order to determine whether each envelope satisfies a predetermined smoothness criterion; and
if the envelopes associated with both of said filters satisfy said smoothness criterion, then for the envelope associated with each of said filters, comparing the envelope value during a predetermined second time interval which is prior to said first time interval to envelope values subsequent to said second time interval in order to produce an indication that said pulse has been detected if said subsequent envelope values exceed said envelope value during said second time interval by at least a predetermined amount for the output signal of at least one of said filters.

2. The method of detecting a dual tone multifrequency pulse in an applied signal, said pulse comprising at least two tones having frequencies which are respectively approximately equal to the frequencies of the two reference tones, said method comprising the steps of:
bandpass filtering the applied signal using parallel first and second complex bandpass filters having mutually exclusive pass bands, the pass band of said first filter including the frequency of a first of said reference tones, the pass band of said second filter including the frequency of a second of said reference tones, and each of said filters producing a real and an imaginary representation of the portion of the applied signal which is within the pass band of that filter;

using the real and imaginary representations produced by each of said filters to determine an envelope which defines the portion of the applied signal which is within the pass band of that filter;

monitoring the smoothness of the envelope associated with each of said filters over a predetermined first time interval in order to determine whether each envelope satisfies a predetermined smoothness criterion; and if the envelopes associated with both of said filters satisfy said smoothness criterion, then, for the envelope associated with each of said filters, comparing a minimum envelope value during a predetermined second time interval which is prior to said first time interval to an average of the envelope values during a predetermined third time interval which is al least partly concurrent with said first time interval in order to produce an indication that said pulse has been detected if said average exceeds said minimum by at least a predetermined amount for the portion of the applied signal within the pass band of at least one of said filters.

3. The method defined in claim 2 further comprising the steps of:

if said average exceeds said minimum by said predetermined amount for the portion of the applied signal within the pass band of only one of said filters, then, for the envelope associated with the filter for which said average does not exceed said minimum by said predetermined amount, monitoring the smoothness of the envelope associated with that filter over a predetermined fourth time interval which includes said second time interval and a fifth time interval which is between said second time interval and said first time interval in order to determine whether that envelope satisfies said smoothness criterion; and producing said indication that said pulse has been detected only if that envelope satisfies said smoothness criterion throughout said fourth time interval.

4. The method defined in claim 2 further comprising the steps of:

testing the twist of said envelopes; and producing said indication that said pulse has been detected only if said envelopes have a twist within a predetermined range.

5. The method defined in claim 2 further comprising the steps of:

measuring the energy level represented by the envelope associated with each of said filters; and producing said indication that said pulse has been detected only if the energy level represented by the envelope associated with each of said filters is al least a predetermined minimum energy.

6. The method defined in claim 2 further comprising the steps of:

if said indication that said pulse has been detected has been produced, then, for each of said filters, confirming that the tone in the portion of the applied signal within the pass band of said filters is approximately equal to the reference tone associated with that filter by performing the steps of:

using said real and imaginary representations at least two different times to determine a complex phase angle value having a real component and an imaginary component; and comparing said real and imaginary components to the corresponding components that would be produced by the associated reference tone in order to produce a confirmation that said tone is the same as said reference tone if said real and imaginary components are sufficiently close to said corresponding components.

7. The method defined in claim 6 wherein, for each of said filters, said step of comparing said real and imaginary components comprises the steps of:

determining the ratio of said real and imaginary components; and comparing said ratio to the corresponding ratio for the associated reference tone in order to produce said confirmation that said tone is the same as said reference tone if said ratio is sufficiently close to said corresponding ratio.

8. The method defined in claim 7 wherein said step of determining the ratio comprises the steps of:

computing a first value proportional to the average of a plurality of successive real component values;

computing a second value proportional to the average of a plurality of successive imaginary component values; and computing the quotient of said first and second values.

9. The method defined in claim 2 wherein each of said two different reference tones is one tone in a respective one of two pluralities of reference tones, the frequencies of all of the reference tones in each of said pluralities being in the pass band of a respective one of said filters; wherein a dual tone multifrequency digit is represented by one reference tone in each of said pluralities; and wherein said method further comprises the steps of:

identifying the reference tone in the plurality associated with each filter to which the tone in the pass band of that filter is approximately equal, said identifying step comprising, for each filter, the steps of:

using the real and imaginary representations at at least two different times to determine a complex phase angle value having a real component and an imaginary component; and comparing said real and imaginary components to the corresponding components that would be produced by each of the reference tones in the associated plurality in order to produce an identification of the reference tone in said plurality for which the corresponding components are approximately equal to said real and imaginary components.

10. The method defined in claim 9 wherein, for each of said filters, said step of comparing said real and imaginary components comprises the steps of:

determining the ratio of said real and imaginary components; and comparing said ratio to the corresponding ratio for each of the reference tones in the associated plurality in order to produce said identification of the reference tone in said plurality for which said corresponding ratio is approximately equal to said real and imaginary components.

11. The method defined in claim 10 wherein said step of determining the ratio comprises the steps of:

computing a first value proportional to the average of a plurality of successive real component values;

computing a second value proportional to the average of a plurality of successive imaginary component value; and computing the quotient of said first and second values.

12. The method defined in claim 9 further comprising the step of:

using said identification of the reference tone in each of said pluralities to identify said digit.

13. The method defined in claim 2 as employed in a voice processing system to which the applied signal is conveyed by a transmission line, said voice processing system having (1) a playback mode in which the voice processing system applies an outgoing signal to the transmission line and (2) a record mode in which the voice processing system does not apply an outgoing signal to the transmission line, and wherein said predetermined smoothness criterion is based in part on whether the voice processing system is in record or playback mode.

14. The method defined in claim 13 wherein said smoothness criterion requires said envelopes to be smoother while the voice processing system is in record mode than while the voice processing system is in playback mode.

15. The method defined in claim 2 as employed in a voice processing system to which the applied signal is conveyed by a transmission line, said voice processing system having (1) a playback mode in which the voice processing system applies an outgoing signal to the transmission line and (2) a record mode in which the voice processing system does not apply an outgoing signal to the transmission line, and wherein said predetermined amount is based in part on whether the voice processing system is in record or playback mode.

16. The method defined in claim 15 wherein said predetermined amount is greater while the voice processing system is in record mode than while the voice processing system is in playback mode.

17. Apparatus for detecting a dual tone multifrequency pulse in an applied signal, said pulse comprising at least two tones having frequencies which are respectively approximately equal to the frequencies of two reference tones, said apparatus comprising:

first and second bandpass filters for bandpass filtering the applied signal, the pass band of said first filter including the frequency of a first of said reference tones, and the pass band of said second filter including the frequency of a second of said reference tones;

means for determining the envelope of the output signal of each of said filters;

means for monitoring the smoothness of the envelope associated with each of said filters over a predetermined first time interval in order to determine whether each envelope satisfies a predetermined smoothness criterion; and means for comparing the envelope value associated with each of said filters during a predetermined second time interval which is prior to said first time interval to envelope values subsequent to said second time interval in order to produce an indication that said pulse has been detected if the envelopes associated with both of said filters satisfy said smoothness criterion and if said subsequent envelope values exceed said envelope value during said second time interval by at least a predetermined amount for the output signal of at least one of said filters.

18. Apparatus for detecting a dual tone multifrequency pulse in an applied signal, said pulse comprising at least two tones having frequencies which are respectively approximately equal to the frequencies of two different reference tones, said apparatus comprising:

parallel first and second complex bandpass filters for filtering said applied signal, said filters having mutually exclusive pass bands, the pass band of said first filter including the frequency of a first of said reference tones, the pass band of said second filter including the frequency of a second of said reference tones, and each of said filters producing a real and an imaginary representation of the portion of the applied signal which is within the pass band of that filter;

means for using the real and imaginary representations produced by each of said filters to determine an envelope which defines the portion of the applied signal which is within the pass band of that filter;

means for monitoring the smoothness of the envelope associated with each of said filters over a predetermined first time interval in order to determine whether each envelope satisfies a predetermined smoothness criterion; and means responsive to a determination that the envelope associated with both of said filters satisfy said smoothness criterion for comparing a minimum envelope value for each filter during a predetermined second time interval which is prior to said first time interval to an average of the envelope values for that filter during a predetermined third time interval which is at least partly concurrent with said first time interval in order to produce an indication that said pulse has been detected if said average exceeds said minimum by at least a predetermined amount for the portion of the applied signal within the pass band of at least one of said filters.

19. The apparatus defined in claim 18 further comprising:

means responsive to a determination that said average exceeds said minimum by said predetermined amount for the portion of the applied signal within the pass band of only one of said signals for monitoring the smoothness of the envelope associated with the filter for which said average does not exceed said minimum by said predetermined amount over a predetermined fourth time interval which includes said second time interval and a fifth time interval which is between said second time interval and said first time interval in order to determine whether that envelope satisfies said smoothness criterion; and means for producing said indication that said pulse has been detected only if that envelope satisfies said smoothness criterion throughout said fourth time interval.

20. The apparatus defined in claim 18 further comprising:

means for testing the twist of said envelopes; and means for producing said indication that said pulse has been detected only if said envelopes have a twist within a predetermined range.

21. The apparatus defined in claim 18 further comprising:

means for measuring the energy level represented by the envelope associated with each of said filters; and means for producing said indication that said pulse has been detected only if the energy level represented by the envelope associated with each of said filters is at least a predetermined minimum energy.

22. The apparatus defined in claim 18 further comprising:

means responsive to said indication that said pulse has been detected for confirming that the tone in the portion of the applied signal within the pass band of each of said filters is approximately equal to the reference tone associated with that filter, said means for confirming comprising for each filter:

means for using said real and imaginary representations at at least two different times to determine a complex phase angle value having a real component and an imaginary component; and means for comparing said real and imaginary components to the corresponding components that would be produced by the associated reference tone in order to produce a confirmation that said tone is the same as said reference tone if said real and imaginary components are sufficiently close to said corresponding components.

23. The apparatus defined in claim 22 wherein, for each of said filters, said means for comparing said real and imaginary components comprises:

means for determining the ration of said real and imaginary components; and means for comparing said ratio to the corresponding ratio for the associated reference tone in order to produce said confirmation that said tone is the same as said reference tone if said ratio is sufficiently close to said corresponding ratio.

24. The apparatus defined in claim 23 wherein said means for determining the ratio comprises:

means for computing a first value proportional to the average of a plurality of successive real component values;

means for computing a second value proportional to the average of a plurality of successive imaginary component values; and means for computing the quotient of said first and second values.

25. The apparatus defined in claim 18 wherein each of said two different reference tones is one tone in a respective one of two pluralities of reference tones, the frequencies of all of the reference tones in each of said pluralities being in the pass band of a respective one of said filters; wherein a dual tone multifrequency digit is represented by one reference tone in each of said pluralities; and wherein said apparatus further comprises:

means responsive to said indication that said pulse has been detected for identifying the reference tone in the plurality associated with each filter to which the tone in the pass band of that filter is approximately equal, said means for identifying comprising for each filter:

means for using said real and imaginary representations at at least two different times to determine a complex phase angle value having a real component and an imaginary component; and means for comparing said real and imaginary components to the corresponding components that would be produced by each of the reference tones in the associated plurality in order to produce an identification of the reference tone in said plurality for which said corresponding components are approximately equal to said real and imaginary components.

26. The apparatus defined in claim 25 wherein, for each of said filters, said means for comparing said real and imaginary components comprises:

means for determining the ratio of said real and imaginary components; and means for comparing said ratio to the corresponding ratio for each of the reference tones in the associated plurality in order to produce said identification of the reference tone in said plurality for which said corresponding ratio is approximately equal to said real and imaginary components.

27. The apparatus defined in claim 26 wherein said means for determining the ratio comprises:

means for computing a first value proportional to the average of a plurality of successive real component values;

means for computing a second value proportional to the average of a plurality of successive imaginary component values; and means for computing the quotient of said first and second values.

28. The apparatus defined in claim 25 further comprising:

means for using said identification of the reference tone in each of said pluralities to identify said digit.

29. The apparatus defined in claim 18 as employed in a voice processing system to which the applied signal is conveyed by a transmission line, said voice processing system having (1) a playback mode in which the voice processing system applies an outgoing signal to the transmission line and (2) a record mode in which the voice processing system does not apply an outgoing signal to the transmission line, and wherein said predetermined smoothness criterion is based in part on whether the voice processing system is in record or playback mode.

30. The apparatus defined in claim 29 wherein said smoothness criterion requires said envelopes to be smoother while the voice processing system is in record mode than while the voice processing system is in playback mode.

31. The apparatus defined in claim 18 as employed in a voice processing system to which the applied signal is conveyed by a transmission line, said voice processing system having (1) a playback mode in which the voice processing system applies an outgoing signal to the transmission line and (2) a record mode in which the voice processing system does not apply an outgoing signal to the transmission line, and wherein said predetermined amount is based in part on whether the voice processing system is in record or playback mode.

32. The apparatus defined in claim 31 wherein said predetermined amount is greater while the voice processing system is in record mode than while the voice processing system is in playback mode.

* * * * *